Nov. 4, 1941.  E. KÜBLER  2,261,727
RECTIFIER SYSTEM
Filed Feb. 15, 1940   2 Sheets-Sheet 1

INVENTOR
*Erwin Kubler.*
BY
*S. A. Stricklett,*
ATTORNEY

Patented Nov. 4, 1941

2,261,727

UNITED STATES PATENT OFFICE 2,261,727

RECTIFIER SYSTEM

Erwin Kübler, Berlin-Siemensstadt, Germany, assignor to Westinghouse Electric & Manufacturing Company, East Pittsburgh, Pa., a corporation of Pennsylvania Application February 15, 1940, Serial No. 319,065
In Germany November 3, 1938

2 Claims. (Cl. 175—363)

My invention relates to a rectifier system and particularly to such a system consisting of an uneven number of parallel operating groups.

The division of rectifier plants, particularly those of larger power into individual discharge path groups, each of which is equipped with a separate transformer and the feeding potential system of which is rotated in phase with reference to each other in such manner that they supplement each other to produce a total effect of a rectifier system of high phase number is known. Thus, the attainment of a 36 phase reaction on the 3 phase network by connecting three 12 phase rectifier groups in parallel in which the two outer groups are rotated in phase with respect to the center group in different directions by 10° is, for example, known.

To avoid complicated winding arrangements in the main transformer, so-called phase shifting transformers are frequently used for attaining the phase rotation, that is, auxiliary transformers which rotate either the potential supplied by the main transformer or the potential supplied thereto by the desired angle. When there is an uneven number of groups, the potential system of one of the groups which in the following discussion will be designated as the center group, always remains without phase rotation. It was, therefore, always customary in plants with uneven number of groups heretofore to provide the outer groups only with phase shifting transformers.

My invention arises from the fact that by reason of the phase shifting transformers, an increase in the ohmic as well as the inductive potential drops takes place so that in a plant in which only a part of the individual groups are equipped with transformer dissymmetries with reference to the load distribution of the individual groups, these dissymmetries are, in accordance with the invention, avoided by dividing the individual phase shifting transformers in such manner that the phase rotation in them takes place in a plurality of steps, and by equipping also the center group with a phase shifting transformer divided in this manner, the steps of the latter being, however, so connected that the phase rotation produced thereby is mutually counteracted. In this manner, the center group receives no phase rotation. But it is subjected, in spite of this fact, to precisely the same conditions as the other groups with reference to the potential drops produced by the phase shifting transformers. The number of sectional windings required for each phase shifting transformer follows the number of rectifier groups operating together during operation. In a plant with three operating groups, the division of the phase shifting transformers into two parts, each of which produces half the phase rotation of the whole phase shifting transformer is sufficient.

Any reserve groups present are preferably built up precisely the same as the operating groups, the mutual connection of the phase shifting transformer parts of at least the reserve group being made so changeable that the reserve group is in a position to replace any of the different types of connected operating groups.

It is, therefore, an object of my invention to provide an improved conversion system having a plurality of parallel operating converters.

It is a further object of my invention to provide means for maintaining parallel operation of converters shifted in phase to provide a multiplied phase feed back.

It is a still further object of my invention to provide a conversion system comprising parallel operating groups having similar impedance characteristics.

Other objects and advantages will be apparent from the following detailed description taken in conjunction with the accompanying drawings, in which.

Figure 1:
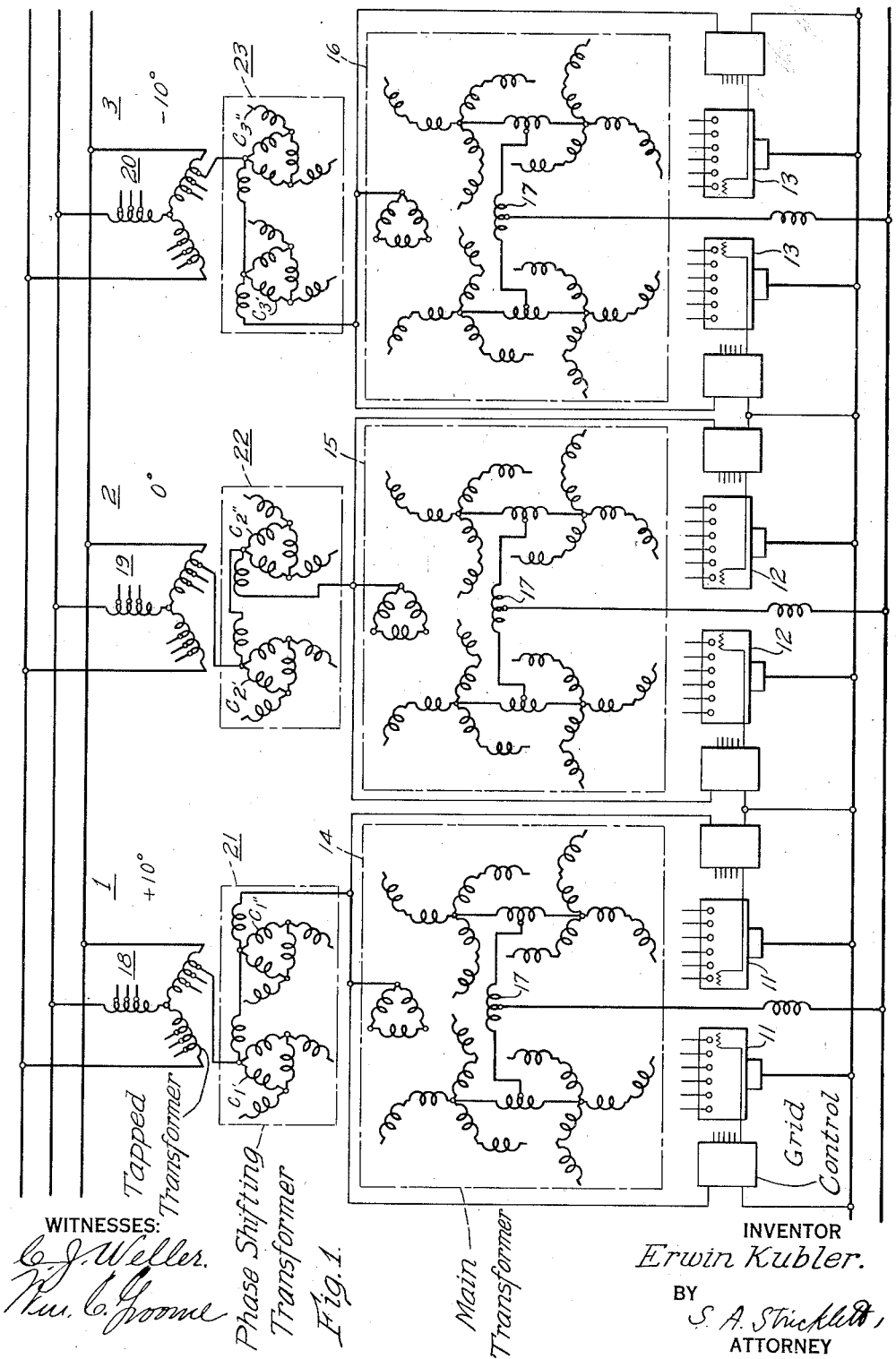
Figure 1 is a diagrammatic layout of a conversion system according to my invention.
Figure 2:
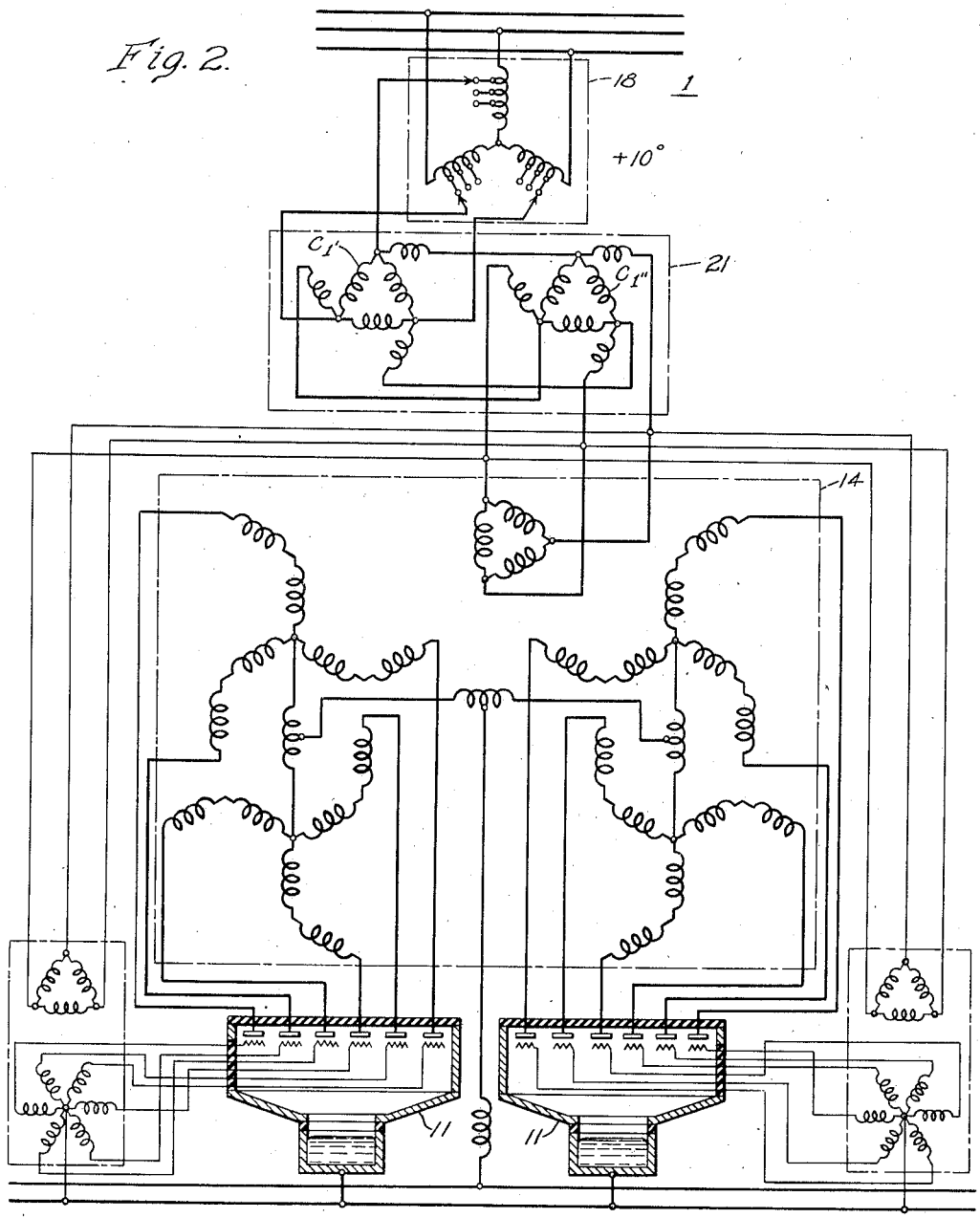
Fig. 2 is a detailed schematic illustration of a group out of Fig. 1.

In the drawings, a 36 phase rectifier plant built up of three 12 phase operating groups 1, 2 and 3, is illustrated as an exemplary embodiment. The discharge vessels 11, 12 and 13 associated with the groups are supplied through the main transformers 14, 15 and 16, each of which, in known manner, comprehends two 6 phase systems displaced by 30° with reference to each other and coupled by an interphase transformer 17. In series with each of the transformers, tapped transformers 18, 19 and 20 respectively, is, in addition connected and with the aid of the tapped transformers, the potential may be regulated in course steps.

In all three groups, phase shifting transformers 21, 22 and 23, each of which consists of two sections each for a phase rotation of 5° connected in series, are connected between the tapped transformers 18, 19 and 20 and the main transformers 14, 15 and 16. These sections which for the phase shifting transformer 21 are identified by $c_1'$ and $c_2'$ are illustrated only diagrammatically. For purposes of illustration, I have shown a preferred form of connection for the phase shifting transformers, however, there are a number of constructions available, all of which may find use.

Figure 3:
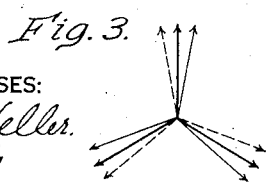
Fig. 3 is a vectorial presentation of the primary phase displacement.
Figure 4:
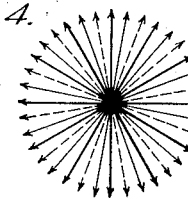
Fig. 4 is a vectorial presentation of the secondary effective phases according to my invention.

To attain a 36 phase back-action on the alternating current circuit, it is necessary to rotate the two outer groups by 10° and −10°, respectively, with reference to the center group. For the potential system supplied by the 3 phase wave transformers, there then results the vector diagram reproduced in Fig. 3. If the fact is taken into consideration that by the action of the main transformers, 14, 15, and 16, a phase multiplication of from 3 to 12 takes place, there results finally the vector according to Fig. 4 which shows a regular 36 phase potential system.

To attain in the two external groups, the phase rotation of 10°, the two sectional windings $c_1'$ and $c_1''$ and $c_3'$ and $c_3''$, respectively, of the two phase shifting transformers 21 and 23 of this group are so connected in series with each other that they function to rotate the phase in the same sense. In the center group, the section winding $c_2'$ and $c_2''$ are on the other hand, so connected to each other that their phase rotation mutually counteract so that accordingly the resultant phase rotation is equal to zero. It is recognized that assuming that the individual sectional windings of the phase shifting transformers have the same dimensions, the ohmic and inductive potential drops in all of the groups must be the same.

The individual sectional groups of the plant are accordingly in every relationship equal electrically so that no non-uniform loading distribution may now arise by reason of the phase rotating devices. It is, in addition, apparent that as a consequence of the basic similar structure of the individual groups, each group may take over the roll of another group of simple rearrangement of the connections.

By the use of well known tap changing equipment (not shown) this rearrangement of the connections can be accomplished without interrupting the operation of the converter system.

In some cases, a reserve group (not shown) may be provided, at least the reserve group, or groups, should be provided with suitable tap changers so that the phase shifting transformers may be readily connected to replace any main section.

While I have shown and described a specific embodiment of my invention, it will be apparent to those skilled in the art, that changes and modifications can be made therein without departing from the true spirit of my invention or the scope of the appended claims.

I claim as my invention:

1. An electric conversion system comprising an uneven number of parallel operating rectifier groups connected between an alternating current circuit and a direct current circuit, each of said groups including a multi-valve rectifier, a main transformer for distributing potential to said valves, a phase shifting transformer connected in series with said main transformer, said phase shifting transformer having a plurality of substantially identical sections, the sections of the phase shifting transformers of the several operating groups being connected to provide output potentials mutually shifted in phase with respect to each other.

2. A rectifier plant consisting of an uneven number of parallel operating groups of rectifiers having a central group and two outer groups, each group including a multi-valve converter and a transformer for distributing potential to said converter, a source of alternating-current supply for said plant, a phase shifting transformer connected between each of said groups and said source, each of said phase shifting transformers being divided into a plurality of sections, the sections of one of said phase shifting transformers being connected to produce a phase shift to the right, another of said phase shifting transformers having the sections connected to produce a phase shift to the left, and another of the phase shifting transformers having its sections connected to produce substantially zero phase shift.

ERWIN KÜBLER.